(12) United States Patent
Fujisaki

(10) Patent No.: US 11,762,611 B2
(45) Date of Patent: Sep. 19, 2023

(54) IMAGE FORMING APPARATUS, NON-TRANSITORY COMPUTER-READABLE STORAGE MEDIUM STORING CONTROL PROGRAM, AND CONTROL METHOD FOR PRINTING AN IMAGE ASSOCIATED WITH PRINT DATA FOR A REGISTERED USER

(71) Applicant: SHARP KABUSHIKI KAISHA, Sakai (JP)

(72) Inventor: Tatsuya Fujisaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/376,016

(22) Filed: Jul. 14, 2021

(65) Prior Publication Data

US 2022/0057974 A1 Feb. 24, 2022

(30) Foreign Application Priority Data

Aug. 20, 2020 (JP) ................................. 2020-139287

(51) Int. Cl.
*G06F 3/12* (2006.01)
*G06K 15/02* (2006.01)

(52) U.S. Cl.
CPC .......... *G06F 3/1238* (2013.01); *G06F 3/1222* (2013.01); *G06F 3/1267* (2013.01); *G06K 15/1814* (2013.01)

(58) Field of Classification Search
None
See application file for complete search history.

(56) References Cited

U.S. PATENT DOCUMENTS 9,367,275 B2    6/2016   Shiratori

FOREIGN PATENT DOCUMENTS

| CN | 104252322 A | | 12/2014 | |
|---|---|---|---|---|
| JP | 2006-099714 A | | 4/2006 | |
| JP | 2006224354 A | * | 8/2006 | ........... G06F 21/608 |
| JP | 2007166439 A | * | 6/2007 | |
| JP | 2008-265081 A | | 11/2008 | |

(Continued)

OTHER PUBLICATIONS

English translation of Japanese Patent Application 2005-038624, corresponding to Japanese Patent Application Publication 2006-224354. (Year: 2005).*

(Continued)

*Primary Examiner* — Thomas D Lee
(74) *Attorney, Agent, or Firm* — ScienBiziP, P.C.

(57) ABSTRACT

An image forming apparatus has a user authentication function of performing user authentication and permitting login by a registered user registered in advance. The apparatus includes a communicator, a receiver, a detector, and an image former. The communicator communicates with an external device storing print data of the registered user. The receiver receives the print data sent from the external device. The detector detects whether or not the registered user is logged in. The image former prints an image associated with the print data of the registered user on a recording medium when the detector detects that the registered user is logged in and the receiver receives the print data of the logged-in registered user.

4 Claims, 8 Drawing Sheets

(56) References Cited

FOREIGN PATENT DOCUMENTS

JP        2009129361 A  *  6/2009  ........... G06F 21/608
JP        2021016952 A  *  2/2021

OTHER PUBLICATIONS

English translation of Japanese Patent Application 2007-306301, corresponding to Japanese Patent Application Publication 2009-129361. (Year: 2007).*
English translation of Japanese Application Publication 2007-166439. (Year: 2007).*
English translation of JP-2021016952-A. (Year: 2021).*

* cited by examiner

IMAGE FORMING APPARATUS, NON-TRANSITORY COMPUTER-READABLE STORAGE MEDIUM STORING CONTROL PROGRAM, AND CONTROL METHOD FOR PRINTING AN IMAGE ASSOCIATED WITH PRINT DATA FOR A REGISTERED USER

BACKGROUND OF THE INVENTION

Field of the Invention

The present invention relates to an image forming apparatus, a control program, and a control method, in particular, for example, to an image forming apparatus having a user authentication function, a non-transitory computer-readable storage medium storing a control program, and a control method.

Description of the Background Art

An example of such background technology is disclosed in Japanese Unexamined Patent Publication No. 2006-099714. According to the technology disclosed in Japanese Unexamined Patent Publication No. 2006-099714, after user authentication using an IC card or the like is performed in an image forming apparatus, a transmission instruction for sending print data is sent from the image forming apparatus to a server, and an information processing apparatus that received the transmission instruction sends the print data to the image forming apparatus. The image forming apparatus that received the print data prints an image in accordance with the print data.

According to the background art, even when print data is received by the image forming apparatus after a registered user has logged out, an image in accordance with the print data is printed.

With recent image forming apparatuses, the login state of registered users is detected in response to the reception of print data in order to ensure security.

When a logged-in state of a registered user is not detected, an image in accordance with the print data is not printed.

However, under the conventional technology, a registered user may logout and another registered user may log in before print data is received by the image forming apparatus after a transmission instruction for the print data is sent from the image forming apparatus to the information processing apparatus.

In such a case, the logged-in state of a registered user is detected, and an image in accordance with the print data is printed. Therefore, there is a risk of the printed copy being taken away by a registered user different from the registered user who sent the transmission instruction. This poses a problem in terms of security.

Therefore, a primary object of the present invention is to provide a novel image forming apparatus, a non-transitory computer-readable storage medium storing a control program, and a control method.

Another object of the present invention is to provide an image forming apparatus, a non-transitory computer-readable storage medium storing a control program, and a control method that can ensure security.

SUMMARY OF THE INVENTION

A first aspect of the invention is an image forming apparatus having a user authentication function of performing user authentication processing and permitting login for a registered user registered in advance. The image forming apparatus includes a communicator that communicates with an external device storing print data of the registered user; a receiver that receives the print data sent from the external device; a detector that detects whether or not the registered user is logged in; and an image former that prints an image associated with the print data of the registered user on a recording medium when the detector detects that the registered user is logged in and the receiver receives the print data of the logged-in registered user.

A second aspect of the invention is the image forming apparatus according to the first aspect of the invention, further including a first notifier that notifies the registered user corresponding to the print data received by the receiver at a notification destination that the image associated with the print data is not printed when the image former is not able to print the image, the notification destination being assigned to the registered user.

A third aspect of the invention is the image forming apparatus according to the second aspect, further including an operation unit that accepts an input operation by a user; and a second notifier that notifies the registered user at the notification destination that some of the print data is not received while the registered user is logged in and after the operation unit accepts a predetermined reception operation for receiving the print data, the print data corresponding to the registered user.

A fourth aspect of the invention is a non-transitory computer-readable storage medium storing a control program for causing a processor of an image forming apparatus having a user authentication function of performing user authentication and permitting login by a registered user registered in advance and including an image former that prints an image on a recording medium, to function as a communicator that communicates with an external device storing print data of the registered user; a receiver that receives the print data sent from the external device; a detector that detects whether or not the registered user is logged in; and an image forming controller that causes the image former to print an image associated with the print data of the registered user on a recording medium when the detector detects that the registered user is logged in and the receiver receives the print data of the logged-in registered user.

A fifth aspect of the invention is a control method for causing a processor of an image forming apparatus having a user authentication function of performing user authentication and permitting login by a registered user registered in advance and including an image former that prints an image on a recording medium, to perform the steps of communicating with an external device storing print data of the registered user; receiving the print data sent from the external device; detecting whether or not the registered user is logged in; and causing the image former to print an image associated with the print data of the registered user on a recording medium when the detector detects that the registered user is logged in and the receiver receives the print data of the logged-in registered user.

According to the invention, security can be ensured.

The above or other objects, features, and advantages of the invention will be better understood by reading the following detailed description of embodiments with reference to the drawings.

DESCRIPTION OF THE PREFERRED EMBODIMENTS

First Embodiment

Figure 1:
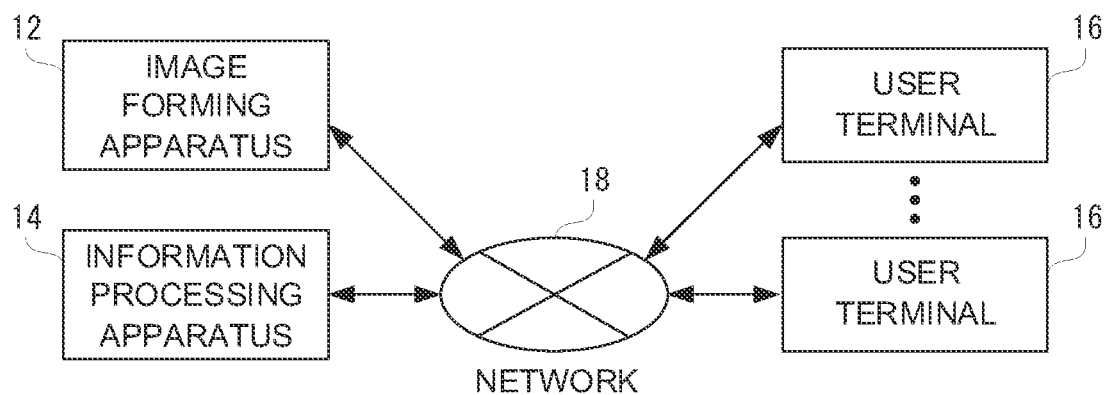
FIG. 1 is a diagram illustrating an example of a configuration of a printing system.

FIG. 1 is a diagram illustrating an example of the configuration of a printing system 10 according to a first embodiment. As illustrated in FIG. 1, the printing system 10 includes an image forming apparatus 12, an information processing apparatus 14, and multiple user terminals 16.

The image forming apparatus 12 is a multifunction peripheral (MFP) having a photocopy function (copy function), a printer function, a scanner function, a facsimile function, etc. However, the image forming apparatus 12 is also applicable to other image forming apparatuses such as printing devices (printers).

The information processing apparatus 14 is a general-purpose server. Note that the information processing apparatus 14 may be, for example, an image forming apparatus such as an MFP.

The user terminals 16 include communication terminals, such as mobile phones (including those referred to as smart phones) and portable information devices (PDAs), desktop personal computers (PCs), notebook (laptop) PCs, tablet PCs, and the like.

The user terminals 16 each includes at least a central processing unit (CPU), a communicator for communicating with outside, and a storage or a nonvolatile memory, such as electrically erasable programmable read-only memory (EEPROM).

The communicator includes a communication module, such as a network interface card (NIC), or a communication circuit for wired or wireless connection with a network 18. The communicator performs communication via the network 18 in accordance with instructions from the CPU. As an example, the communicator sends and receives data according to a wired communication method conforming to a communication standard such as Ethernet (registered trademark), or a wireless communication method conforming to a communication standard such as IEEE 802.11. This is the same for the communicator 40 (see FIG. 2) and the communicator 58 (see FIG. 3) described below.

The image forming apparatus 12, the information processing apparatus 14, and the user terminals 16 are connected to each other via the network 18 including the Internet. Note that the network 18 may include a telephone network (a public telephone network or a mobile telephone communication network) and the Internet.

The image forming apparatus 12 and the information processing apparatus 14 may be directly connected to each other. This is also true for the information processing apparatus 14 and the user terminals 16.

Figure 2:
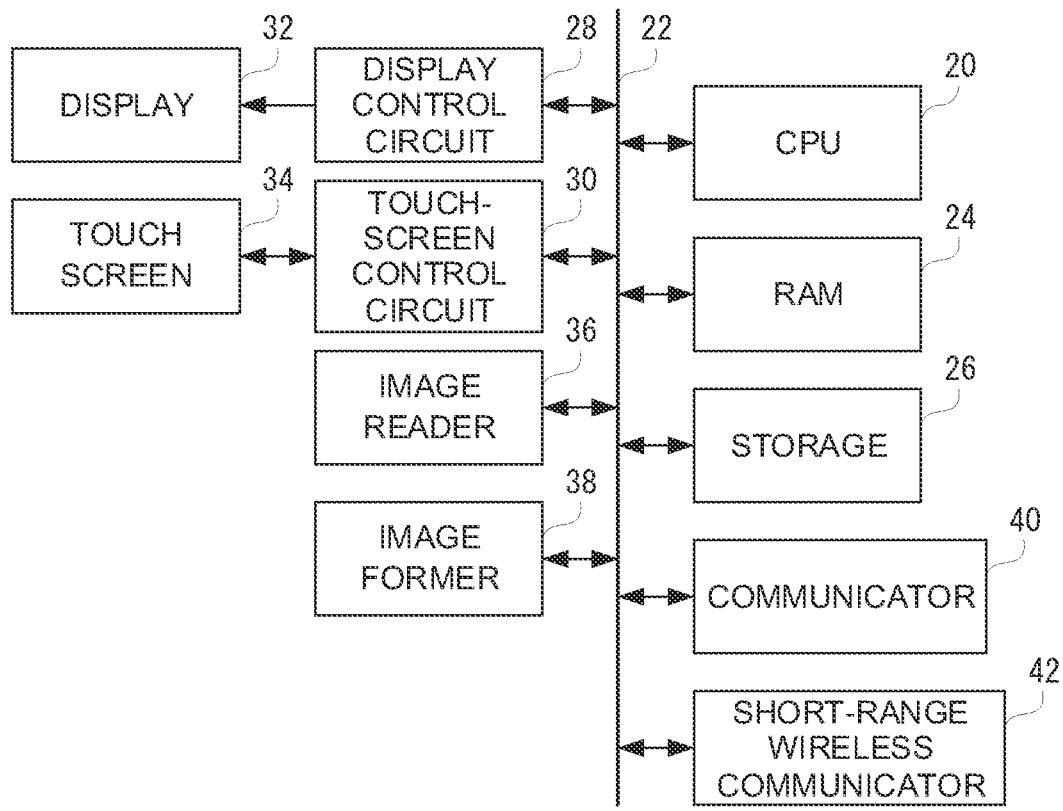
FIG. 2 is a block diagram illustrating an electrical configuration of an image forming apparatus.

FIG. 2 is a block diagram illustrating the electrical configuration of the image forming apparatus 12 illustrated in FIG. 1. As illustrated in FIG. 2, the image forming apparatus 12 includes a CPU 20. The CPU 20 is connected via a bus 22 to a RAM 24, a storage 26, a display control circuit 28, a touch screen control circuit 30, an image reader 36, an image former 38, a communicator 40, and a short-range wireless communicator 42.

The image forming apparatus 12 further includes a display 32 and a touch screen 34. The display control circuit 28 is connected to the display 32, and the touch screen control circuit 30 is connected to the touch screen 34.

The CPU 20 comprehensively controls the image forming apparatus 12. The RAM 24 is used as a work area and a buffer area of the CPU 20.

The storage 26 is the main storage device of the image forming apparatus 12, and includes a nonvolatile memory, such as an HDD or an EEPROM. The storage 26 may include the RAM 24. The storage 26 stores data for a control program for the CPU 20 to control the operations of the components of the image forming apparatus 12, data for generating image data (display image data) for various screens, data necessary for the execution of the control program, and the like.

The display control circuit 28 includes a GPU, a VRAM, etc. The GPU, under an instruction from the CPU 20, generates, in the VRAM, display image data for displaying various screens on the display 32 using image generation data 204b (see FIG. 7) stored in the RAM 24, and outputs the generated display image data to the display 32. The display 32 may be, for example, a liquid crystal display (LCD), an electro-luminescent (EL) display.

The touch screen control circuit 30 applies a voltage necessary for the touch screen 34, detects a touch operation or a touch input within an effective touch range of the touch screen 34, and outputs, to the CPU 20, touch coordinate data indicating the position of the touch input. Note that, hereinafter, an operation on the touch screen 34 by a user may be referred to as a user operation.

The touch screen 34 is a general-purpose touch screen and may be any type of touch screen such as an electrostatic capacitance type, an electromagnetic induction type, a resistance film type, and an infrared type. In the first embodiment, the touch screen 34 is of an electrostatic capacitance type. The touch screen 34 is disposed on the display surface of the display 32. The display 32 and the touch screen 34 may be integrated into a touch screen display.

The image reader 36 includes a light source, multiple mirrors, an imaging lens, and a line sensor. The image reader 36 guides the light reflected from the surface of a document to the imaging lens with the mirrors. Then, the reflected light is imaged on the light receiving element of the line sensor by the imaging lens. The line sensor detects the luminance or chromaticity of the image of the reflected light formed at the light receiving elements, and generates a read image based on the image on the surface of the document, to input the image. The line sensor is a complementary metal oxide semiconductor (CMOS), a charged-coupled device (CCD), or the like.

The image former 38 includes a photoconductive drum, a charging device, an exposure device, a developing device, a transfer device, and a fixing device. The image former 38 forms an output image through an electrophotographic method on a recording medium (sheet) transported from the sheet tray or the like, and outputs the sheet on which the image has been formed to an output tray. The output image to be formed on the sheet is an image (print image) in accordance with the print data transmitted from the information processing apparatus 14. The recording medium may be any sheet besides a paper sheet, such as an overhead projector (OHP) film.

The short-range wireless communicator 42 includes a communication circuit and an antenna for performing short-range wireless communication by a near-field communication (NFC) method, Bluetooth (registered trademark), or the like. For example, authentication information necessary for user authentication is obtained by short-range wireless communication with an IC card. Note that short-range wireless communication is performed by a method conforming to standards such as ISO/IEC 18092 and ISO/IEC 14443.

Figure 3:
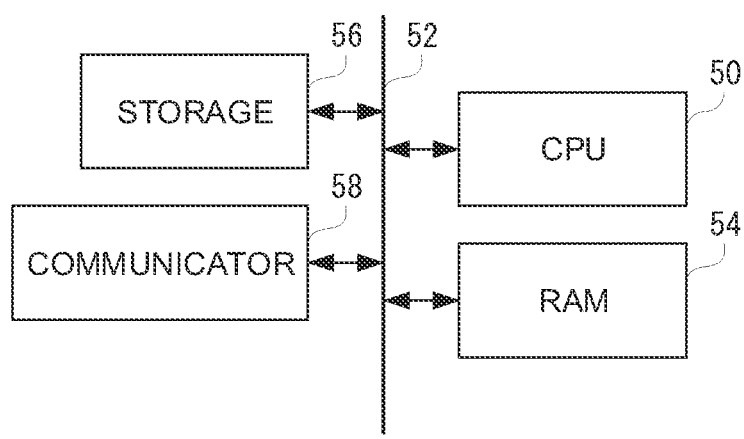
FIG. 3 is a block diagram illustrating an electrical configuration of an information processing apparatus.

FIG. 3 is a block diagram illustrating the electrical configuration of the information processing apparatus 14 illustrated in FIG. 1. As illustrated in FIG. 3, the information processing apparatus 14 includes a CPU 50. The CPU 50 is connected to a RAM 54, a storage 56, and a communicator 58 via a bus 52.

The CPU 50 comprehensively controls the information processing apparatus 14. The RAM 54 is used as a work area and a buffer area of the CPU 50.

The storage 56 is the main storage device of the information processing apparatus 14, and includes a nonvolatile memory such as an HDD or an EEPROM. Further, the storage 56 may be configured to include the RAM 54. The storage 56 stores data for a control program for the CPU 50 to control the operations of the components of the information processing apparatus 14, data necessary for the execution of the control program, etc.

Note that the electrical configurations of the image forming apparatus 12 in FIG. 2 and the information processing apparatus 14 in FIG. 3 are mere examples, and are not limited thereto.

In the first example, when any one of the user terminals 16 receives a registration operation of print data (hereinafter simply referred to as a "registration operation"), the print data is transmitted from the user terminal 16 to the information processing apparatus 14.

Print data corresponds to PDF data, image data in a predetermined format, and data created by predetermined application software, such as predetermined document creation software or predetermined spreadsheet software.

The print data received by the information processing apparatus 14 includes user data indicating a predetermined registered user. The print data received by the information processing apparatus 14 is stored in the information processing apparatus 14. In other words, the information processing apparatus 14 stores print data for each registered user.

A registered user is a user who is registered and allowed to log in to the image forming apparatus 12. A registered user indicated by print data matches the user who performed a registration operation.

The operation of the image forming apparatus 12 will now be described. When the main power source of the image forming apparatus 12 is turned on and the image forming apparatus 12 enters a standby state in which a process corresponding to each function can be executed, a home screen 100 (see FIG. 4) is displayed on the display 32 of the image forming apparatus 12.

Figure 4:
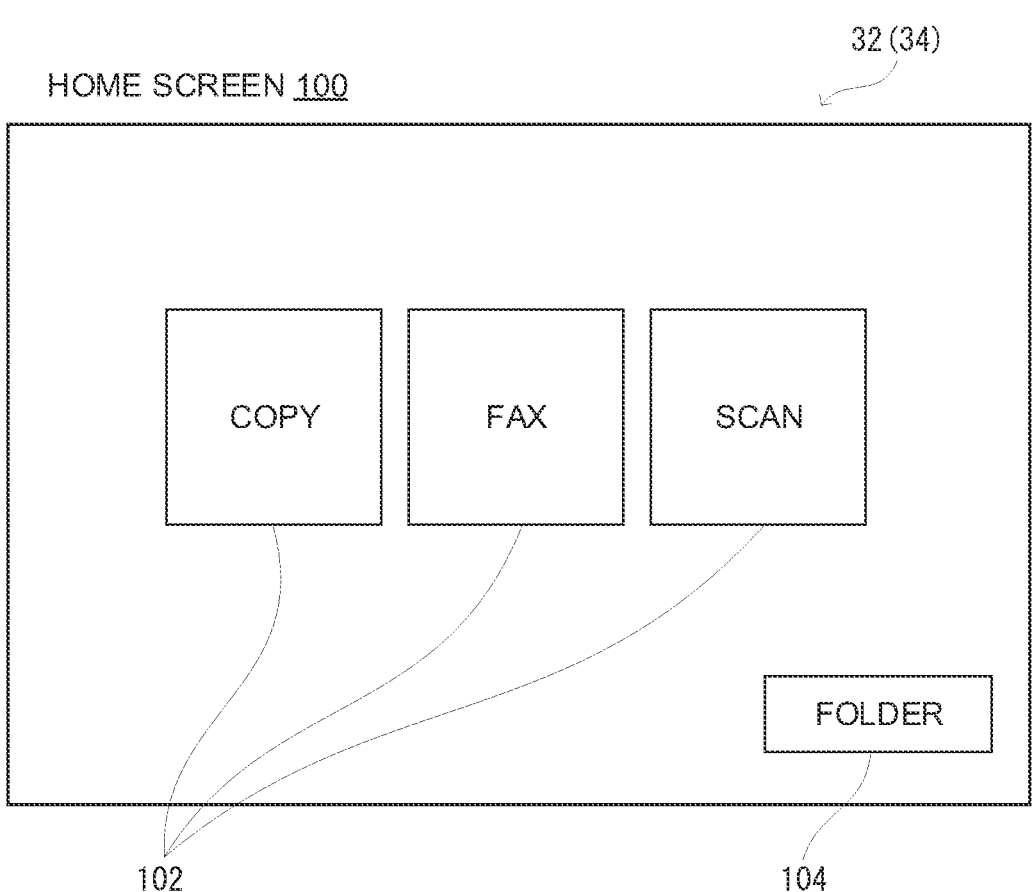
FIG. 4 is a diagram illustrating an example of a home screen displayed on a display of the image forming apparatus.

FIG. 4 illustrates an example of the home screen 100. The home screen 100 is for selecting a desired function from various functions (or jobs) of the image forming apparatus 12.

However, a user operation on the home screen 100 is accepted when a predetermined registered user successfully logs in, i.e., is successfully authenticated.

In the first embodiment, user authentication is performed by holding a storage medium such as an IC card, a smart phone, or a feature phone over the short-range wireless communicator 42.

When the image forming apparatus 12 includes a physical feature detector for detecting a human physical feature, such as a face or a fingerprint, the user authentication may be performed using a physical feature of the registered user.

The user authentication may be performed by an external device (e.g., a general-purpose server) that is communicably connected to the image forming apparatus 12. Note that the method of user authentication is not limited to any particular method.

The home screen 100 has multiple function selection keys 102 and a folder key 104.

The function selection keys 102 are provided for selection of a copy function, a fax function, or a scan function.

Each of the function selection keys 102 is assigned a function for displaying an operation screen on the display 32.

When a predetermined function selection key 102 is operated, an operation screen for activating the function (for example, the copy function) corresponding to the operated function selection key 102 is displayed on the display 32. Note that, since activating the copy function or the like is already well known and is not an essential part of the present invention, a detailed description thereof is omitted.

The folder key 104 is provided to present the print data stored in the information processing apparatus 14.

The folder key 104 has a function of obtaining print data corresponding to a registered user in a logged-in state and to display a predetermined operation screen on the display 32.

Figure 5:
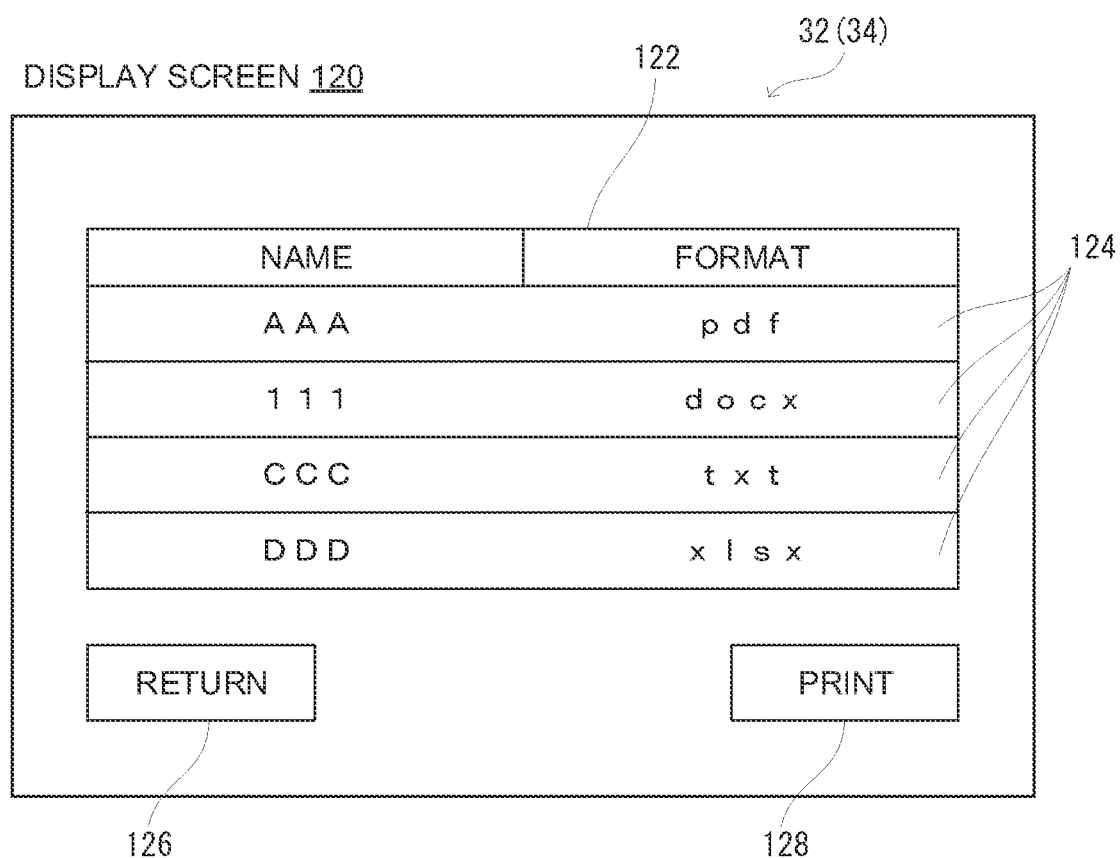
FIG. 5 is a diagram illustrating an example of a display screen displayed on the display of the image forming apparatus.

When the folder key 104 is operated, a display screen 120 (see FIG. 5) appears on the display 32.

The display screen 120 is for displaying a list of print data. The display screen 120 has a display region 122, a return key 126, and a print key 128. The display region 122 is provided with multiple selection keys 124.

The selection keys 124 are provided for selection of print data. The selection keys 124 are assigned the function of selecting the print data (use data) to be used for printing.

When a predetermined selection key 124 is operated, the print data corresponding to the operated selection key 124 is selected as use data.

Note that each of the selection keys 124 displays information about the print data, in particular, for example, the name and format of the print data. For example, the date and time stored in the information processing apparatus 14 may be displayed in response to a registration operation.

The return key 126 is provided to return to the previous screen. The return key 126 is assigned a function of displaying the previous screen on the display 32.

When the return key 126 is operated, the home screen 100 appears on the display 32.

The print key 128 is provided for printing an image in accordance with the print data. The print key 128 is assigned the function of obtaining print data and printing an image.

When the print key 128 is operated while predetermined print data is selected as use data, an image is printed in accordance with the print data corresponding to the use data.

Specifically, when the print key 128 is operated, a transmission instruction for the print data corresponding to the use data is sent from the image forming apparatus 12 to the information processing apparatus 14.

The information processing apparatus 14 that has received the transmission instruction sends the print data corresponding to the transmission instruction to the sender of the transmission instruction.

In other words, the image forming apparatus 12 receives print data. The image forming apparatus 12 also prints an image in response to the reception of the print data.

The print data sent from the information processing apparatus 14 to the image forming apparatus 12 is deleted from the information processing apparatus 14.

The print data used to print an image is deleted from the image forming apparatus 12.

In order to ensure the security of the printed copy, if none of the registered users are logged in, an image is not printed even after print data is received by the image forming apparatus 12.

In the image forming apparatus 12 as described above, a logged-in registered user may log out in a predetermined manner, and another registered user may successfully log in before the print data is received.

In such a case, the presence of the logged-in registered user causes an image to be printed by the image forming apparatus 12. Therefore, there is a risk of the printed copy being take away by a registered user different from the registered user who was logged-in immediately before.

To avoid such inconveniences, in the first embodiment, an image is printed when there is a logged-in registered user and the print data corresponding to the logged-in registered user is received by the image forming apparatus 12.

In the first embodiment, a first notification process is executed when a non-printing condition for not printing an image is satisfied. That is, the first notification process is executed when an image cannot be printed.

As described above, the non-printing condition is satisfied when there is no logged-in registered user and the print data is received by the image forming apparatus 12.

The non-printing condition is also satisfied when there is a registered user in the logged-in state and print data corresponding to a registered user other than the registered user in the logged-in state is received by the image forming apparatus 12.

In the first embodiment, when the first notification process is executed, the registered user corresponding to the received print data is notified at the notification destination that the image has not been printed. Note that the notification destination of the registered user is set in advance. The notification destination of the registered users is an email address.

Specifically, information about the print data received by the image forming apparatus 12, that is, information such as the name, the format, etc., of the print data is used to notify the registered user at the notification destination that the image has not been printed.

For example, an email message "AAA (data name) was not printed" is sent to the registered user at the notification destination.

Note that in response to the execution of the first notification process, the print data received by the image forming apparatus 12 is deleted.

Figure 6:
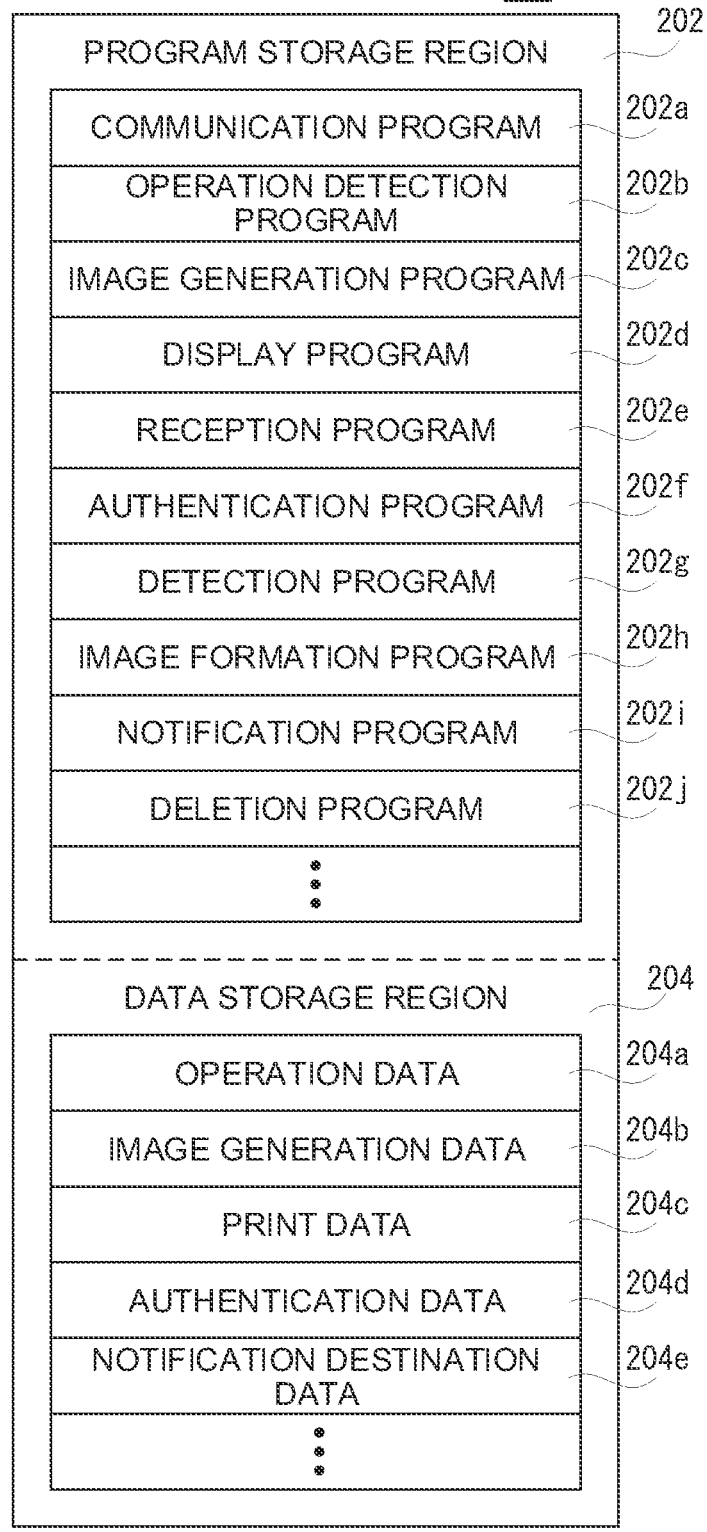
FIG. 6 is a diagram illustrating an example of a memory map of a RAM of the image forming apparatus.
Figure 7:
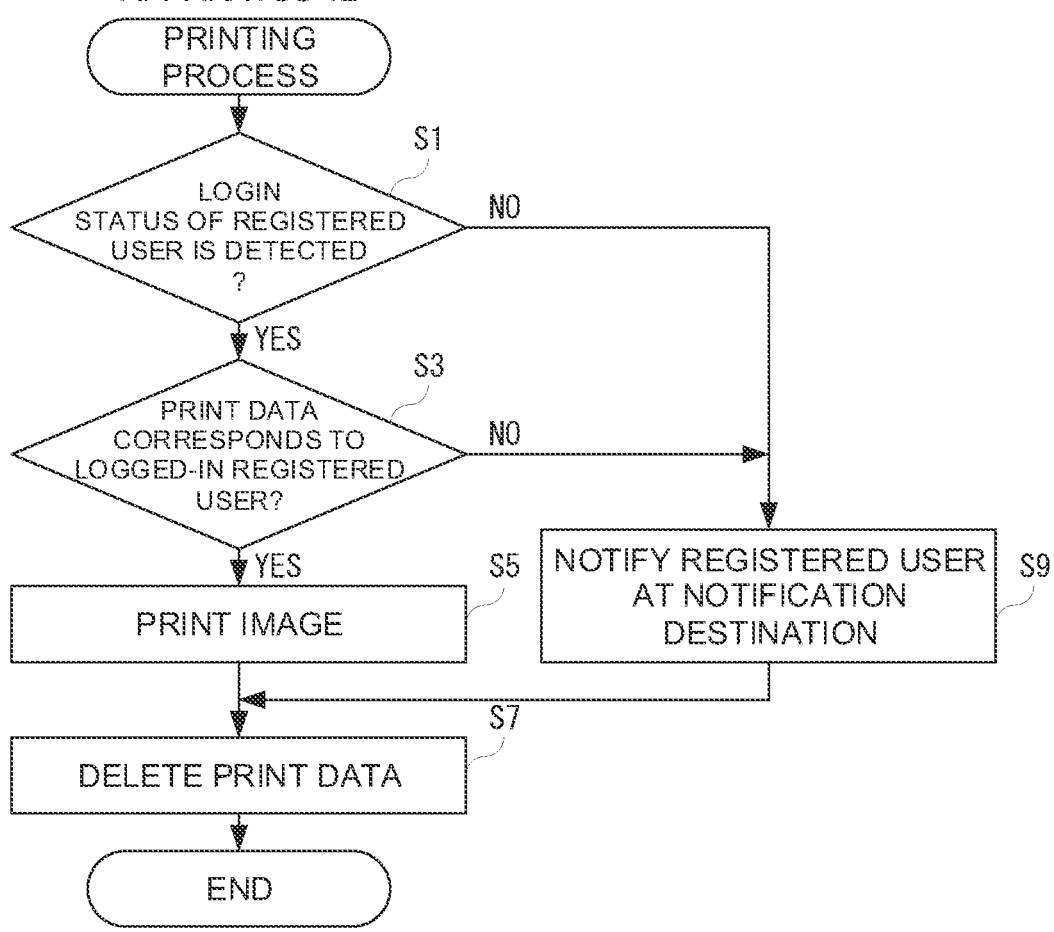
FIG. 7 is a flowchart illustrating an example of a printing process by a CPU of the image forming apparatus.

FIG. 6 is a diagram illustrating an example of a memory map 200 of the RAM 24 of the image forming apparatus 12 illustrated in FIG. 1. As illustrated in FIGS. 6 and 7, the RAM 24 includes a program storage region 202 and a data storage region 204. The program storage region 202 of the RAM 24 stores a control program of the image forming apparatus 12 as an example of an information processing program.

The control program of the image forming apparatus 12 includes a communication program 202a, an operation detection program 202b, an image generation program 202c, a display program 202d, a reception program 202e, an authentication program 202f, a detection program 202g, an image formation program 202h, a notification program 202i, and a deletion program 202j.

The communication program 202a is for controlling the communicator 40 and communicating with external devices.

The communication program 202a is also for controlling the short-range wireless communicator 42 to perform short-range wireless communication with an IC card or the like.

The operation detection program 202b is for detecting operation detection data corresponding to operations to operation units of the image forming apparatus 12. For example, when the touch screen 34 is touched (or operated), the CPU 20 acquires the touch coordinate data output from the touch screen 34 as operation data 204a described below in accordance with the operation detection program 202b, and stores the operation data 204a in a buffer. When a hardware button or key of the image forming apparatus 12 is pressed or operated, the CPU 20 obtains operation data 204a for the pressing or operating of the button or key in accordance with the operation detection program 202b, and stores the operation data 204a in a buffer.

The image generation program 202c is for controlling the GPU to generate display image data for displaying various screens and icons by using image generation data 204b described below.

The display program 202d is for outputting the display image data generated in accordance with the image generation program 202c to the display 32.

The reception program 202e is for receiving print data. The authentication program 202f is for performing user authentication in accordance with authentication information and authentication data 204d obtained in accordance with the communication program 202a.

The detection program 202g is for detecting the login state of a registered user.

The image formation program 202h is for controlling the image former 38 to print an image.

The image formation program 202h is also for printing an image when a logged-in registered user is detected by the detection program 202g and the print data corresponding to the logged-in registered user is received by the reception program 202e.

The notification program 202i is for notifying a registered user corresponding to the received print data at the notification destination that the image has not been printed, when a logged-in registered user is not detected by the detection program 202g and print data is received by the reception program 202e.

The notification program 202i is also for notifying the registered user corresponding to the received print data at the notification destination that the image has not been printed, when a logged-in registered user is detected by the detection program 202g and print data corresponding to a registered user other than the logged-in registered user is received by the reception program 202e.

The deletion program 202j is for deleting the print data after a notification that the image has not been printed is provided in accordance with the notification program 202i.

The deletion program 202*j* is also for deleting the print data used to print the image, in response to the image being printed by the image formation program 202*h*.

Although not illustrated, the program storage region 202 also stores other programs necessary for controlling the image forming apparatus 12.

For example, the program storage region 202 stores a program for determining whether or not a logged-in registered user corresponds to the print data received by the reception program 202*e*.

The data storage region 204 stores operation data 204*a*, image generation data 204*b*, print data 204*c*, authentication data 204*d*, and registration notification destination data 204*e*.

The operation data 204*a* is detected in accordance with the operation detection program 202*b*, and is stored in time series. Note that the operation data 204*a* is deleted after being used for the processing by the CPU 20.

The image generation data 204*b* includes polygon data, texture data, etc., for generating display image data. The image generation data 204*b* also includes image data corresponding to software keys.

The print data 204*c* is received by the image forming apparatus 12. The print data 204*c* includes user data corresponding to predetermined registered users.

The authentication data 204*d* indicates authentication information for the respective registered users. The notification destination data 204*e* indicates the notification destinations of the respective registered users.

Although not illustrated, the data storage region 204 stores other data necessary for the execution of the information processing program, and is provided with flags and counters (timers) necessary for the execution of the information processing program.

FIG. 7 is a flowchart illustrating an example of a printing process performed by the CPU 20 of the image forming apparatus 12. The CPU 20 starts the printing process, for example, in response to the reception of print data.

Step S1 determines whether or not the login state of a registered user is detected. If "NO" in step S1, that is, if a login state of a registered user is not detected, the process proceeds to step S9. If "YES" in step S1, that is, if a login state of a registered user is detected, the process proceeds to step S3.

Step S3 determines whether or not print data corresponds to a logged-in registered user. If "NO" in step S3, that is, if the print data corresponds to a registered user other than the logged-in registered user, the process proceeds to step S9. If "YES" in step S3, that is, if the print data corresponds to the logged-in registered user, an image is printed in step S5, and then the process proceeds to step S7. In step S7, the print data is deleted, and the printing process ends.

In step S9, the registered user destination corresponding to the print data is notified at the notification destination that the image has not been printed, and the process proceeds to step S7.

According to the first embodiment, the security of printed copies can be improved.

Note that multiple print data items may be selected as use data. However, the print data items transmitted from the information processing apparatus 14 are transmitted in a predetermined order.

Specifically, a predetermined print data item among the print data items is transmitted from the information processing apparatus 14 to the image forming apparatus 12. When an image is printed in response to the print data being received by the image forming apparatus 12 or when the first notification process is executed, the next print data item is transmitted from the information processing apparatus 14 to the image forming apparatus 12.

Accordingly, the information processing apparatus 14 transmits at least one print data item corresponding to a predetermined registered user in a predetermined order.

Second Embodiment

The second example is the same as the first embodiment except that a notification is provided about print data being stored (registered) in the information processing apparatus 14. Therefore, redundant descriptions are omitted.

In the second example, when some of the print data corresponding to the logged-in registered user stored in the information processing apparatus 14 is received by the image forming apparatus 12 in response to the detection of an operation for receiving the print data (receiving operation), the second notification process is executed. That is, when some of the print data corresponding to the registered user is not received, the second notification process is executed.

The receiving operation according to the present embodiment corresponds to the operation to the print key 128. However, if there is a hardware button or key assigned to the same function as that of the print key 128, an operation to such a hardware button or key also corresponds to the receiving operation.

In other words, in the second embodiment, the second notification process is executed when the print key 128 is operated after the display screen 120 appears on the display 32 while some print data is selected as use data.

When the second notification process is executed, the logged-in registered user is notified at the notification destination that print data is stored in the information processing apparatus 14.

Specifically, information about the print data corresponding to the logged-in registered user obtained in advance by the image forming apparatus 12 is used to notify the logged-in registered user at the notification destination that print data is stored in the information processing apparatus 14.

For example, the message "AAA (data name) and BBB (data name) are registered in the information processing apparatus 14" is sent to the registered user at the notification destination.

Figure 8:
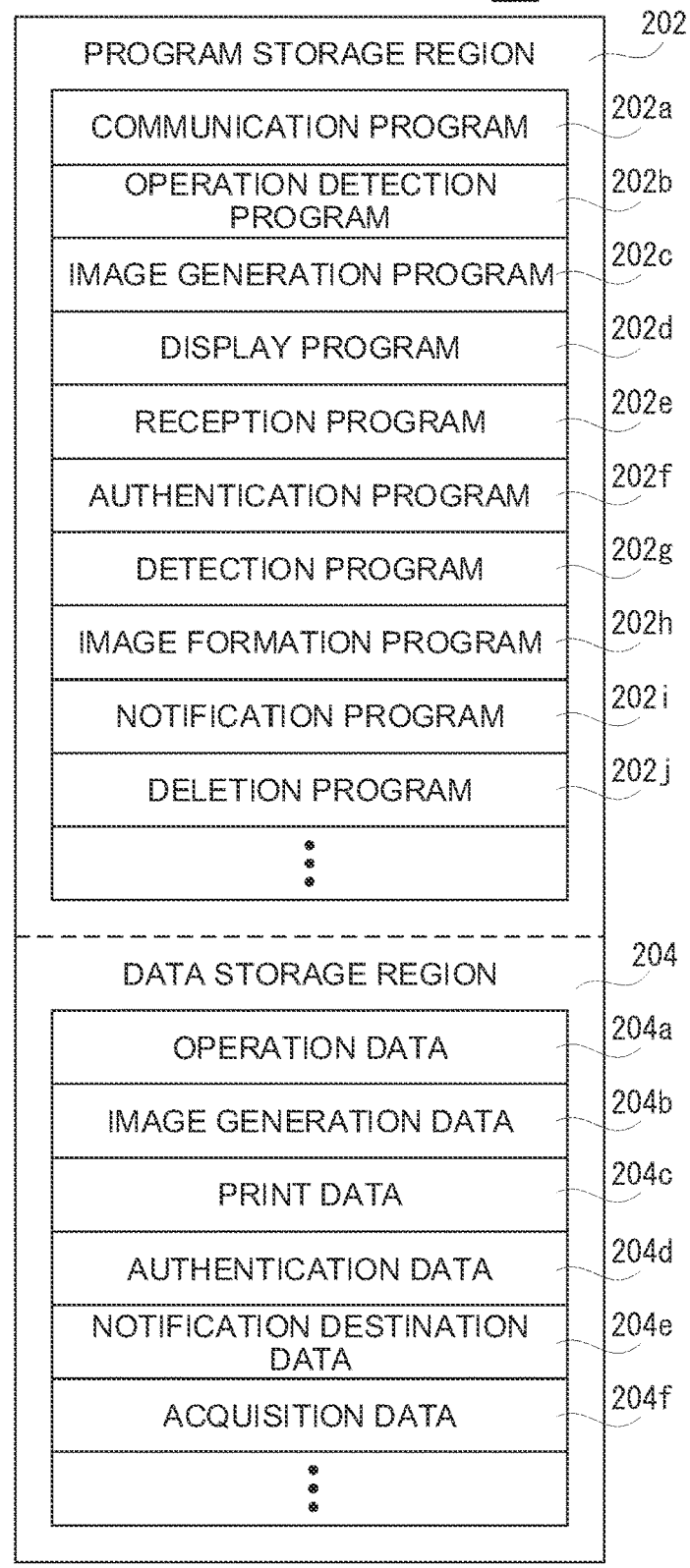
FIG. 8 is a diagram illustrating an example of a memory map of a RAM of the image forming apparatus according to a second embodiment.
Figure 9:
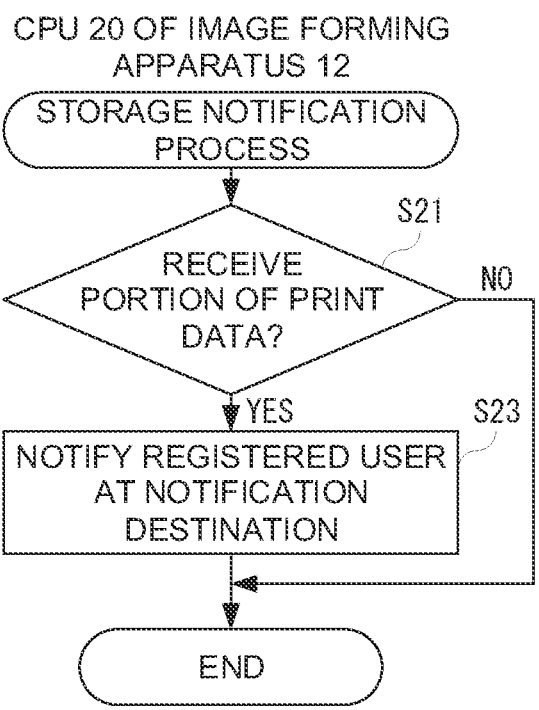
FIG. 9 is a flowchart illustrating a part of an example of a printing process by a CPU of the image forming apparatus according to the second embodiment.

FIG. 8 is a diagram illustrating an example of the memory map 200 of the RAM 24 of the image forming apparatus 12 according to the second embodiment.

The notification program 202*i* of the second embodiment includes a program for notifying the logged-in registered user at the notification destination that print data is stored in the information processing apparatus 14 by referring to acquisition data 204*f* when some of the print data corresponding to the logged-in registered user stored in the information processing apparatus 14 is received by the reception program 202*e* in response to the detection of a receiving operation by the operation detection program 202*b*.

In the second embodiment, the acquisition data 204*f* is updated in the data storage region 204.

The acquisition data 204*f* indicates information about the print data corresponding to the logged-in registered user stored in the information processing apparatus 14.

FIG. 10 is a flowchart illustrating a portion of an example of a storage notification process by the CPU 20 of the image forming apparatus 12 according to the second embodiment.

The CPU 20 starts the storage notification process, for example, in response to the detection of a receiving operation.

Step S21 determines whether or not some of the print data corresponds to the logged-in registered user is to be received. Here, it is determined whether some of the print data corresponding to the logged-in registered user is selected as use data.

If "NO" in step S21, that is, if the entire print data corresponding to the logged-in registered user is to be received, the storage notification process ends. If "YES" in step S21, that is, if some of the print data corresponds to the logged-in registered user is to be received, the process proceeds to step S23.

In step S23, the logged-in registered user is notified at the notification destination that the print data is stored in the information processing apparatus 14, and the storage notification process ends.

According to the second embodiment, the user is notified that the print data is stored in the information processing apparatus 14. Thus, for example, the user can be prompted to print an image in accordance with the print data.

Note that the embodiments are mere examples and can be appropriately modified in an actual product. The flowcharts in the embodiments and modifications are also mere examples, and the order of the steps can be changed in anyway as long as the same effect is achieved.

What is claimed is:

1. An image forming apparatus having a user authentication function of performing user authentication and permitting login by a user registered in advance, the image forming apparatus comprising:
    an operation unit that accepts an input operation by the registered user in which a notification destination is set by the registered user;
    a communicator that communicates with an external device storing print data of the registered user;
    a receiver that receives, from the external device, the print data of the registered user;
    a detector that detects whether or not the registered user is logged in;
    an image former that prints an image associated with the print data of the registered user on a recording medium when the detector detects that the registered user is logged in at the time the print data is received by the receiver; and
    a first notifier that notifies the registered user at the notification destination that some of the print data is not received while the registered user is logged in and after the operation unit accepts a predetermined reception operation for receiving the print data of the registered user.

2. The image forming apparatus according to claim 1, further comprising:
    a second notifier that notifies the registered user at the notification destination that the image associated with the print data of the registered user is not printed when the image former is not able to print the image.

3. A non-transitory computer-readable storage medium storing a control program for causing a processor of an image forming apparatus, having a user authentication function of performing user authentication and permitting login by a user registered in advance and comprising an image former that prints an image on a recording medium, to function as:
    an operation unit that accepts an input operation by the registered user in which a notification destination is set by the registered user;
    a communicator that communicates with an external device storing print data of the registered user;
    a receiver that receives the print data of the registered user sent from the external device;
    a detector that detects whether or not the registered user is logged in;
    an image forming controller that causes the image former to print the image associated with the print data of the registered user on the recording medium when the detector detects that the registered user is logged in and the receiver receives the print data of the logged-in registered user; and
    a first notifier that notifies the registered user at the notification destination that some of the print data is not received while the registered user is logged in and after the operation unit accepts a predetermined reception operation for receiving the print data of the registered user.

4. A control method for causing a processor of an image forming apparatus having a user authentication function of performing user authentication and permitting login by a user registered in advance and comprising an image former that prints an image on a recording medium, the control method comprising:
    accepting an input operation by the registered user in which a notification destination is set by the registered user;
    communicating with an external device storing the print data of the registered user;
    receiving the print data of the registered user sent from the external device;
    detecting whether or not the registered user is logged in;
    causing the image former to print the image associated with the print data of the registered user on the recording medium when the registered user is logged in and the print data of the logged-in registered user is received; and
    notifying the registered user at the notification destination that some of the print data is not received while the registered user is logged in and after accepting a predetermined reception operation for receiving the print data of the registered user.

* * * * *